UNITED STATES PATENT OFFICE.

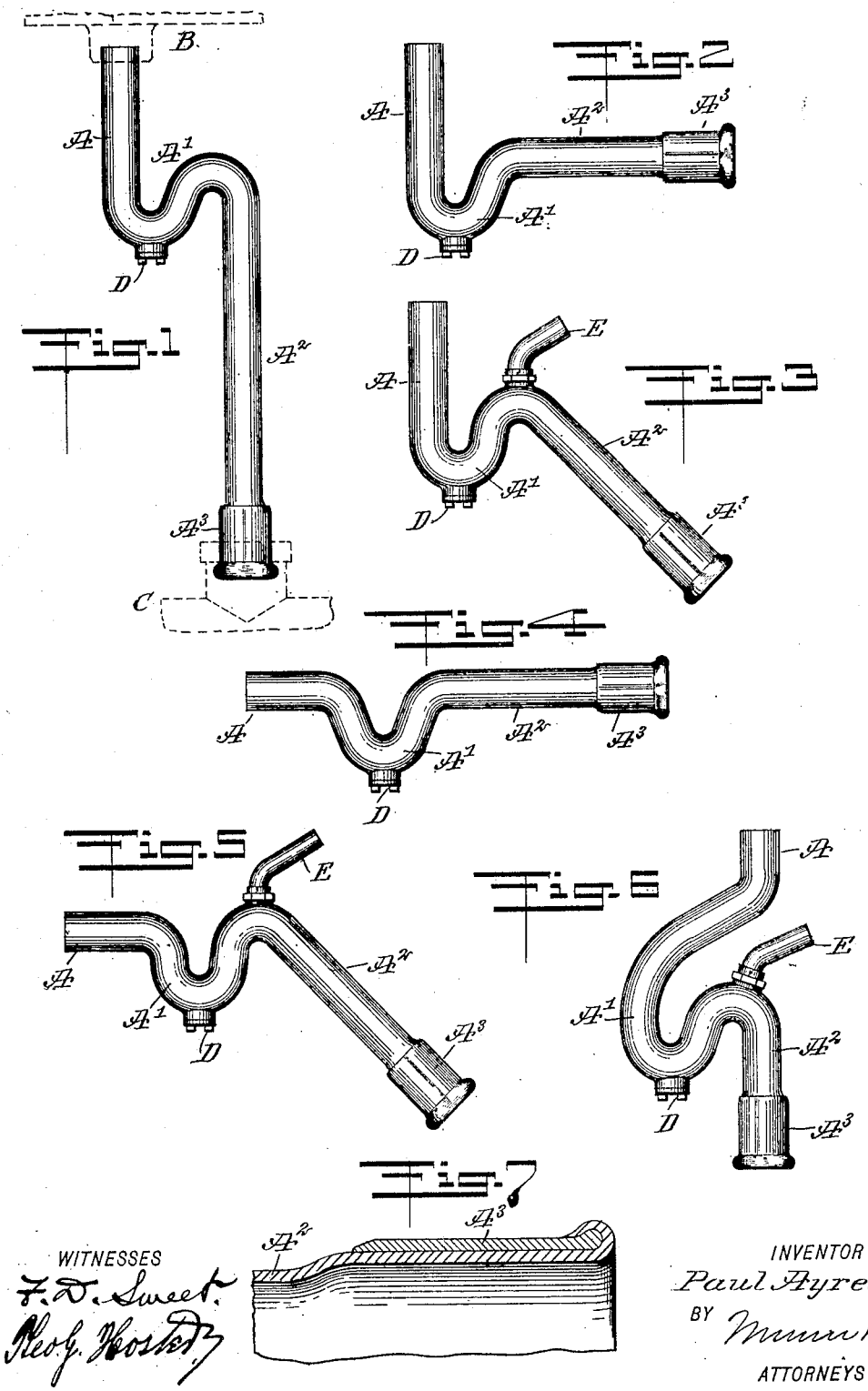

PAUL AYRES, OF OCEAN SIDE, NEW YORK.

TRAP.

No. 887,570.　　　Specification of Letters Patent.　　　Patented May 12, 1908.

Application filed December 3, 1907. Serial No. 404,945.

*To all whom it may concern:*

Be it known that I, PAUL AYRES, a citizen of the United States, and a resident of Ocean Side, in the county of Nassau and State of New York, have invented a new and Improved Trap, of which the following is a full, clear, and exact description.

The invention relates to plumbers' supplies, and its object is to provide a new and improved trap, arranged to permit the plumber to quickly and conveniently connect a sink, basin or like fixture with the soil or waste pipe, and to make a perfect joint with the soil or waste pipe, without requiring the tedious and expensive work of wiping a joint.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in all the views.

Figure 1 is a side elevation of the improvement in the form of an S-trap applied to connect a sink with the soil pipe; Fig. 2 is a side elevation of the improvement in the form of a P-trap; Fig. 3 is a like view of the improvement in the form of a vented three-quarter S-trap; Fig. 4 is a similar view of the improvement in the form of a running trap; Fig. 5 is a like view of the improvement in the form of a vented running Y-trap; Fig. 6 is a similar view of the improvement in the form of a bag trap, and Fig. 7 is an enlarged sectional elevation of the reinforced outlet of the trap.

The various kinds of lead pipe traps manufactured and furnished to plumbers for making connection between the soil pipe and a sink, basin or like fixture require the wiping of a joint at the soil pipe, in order to render the trap safe against leakage of sewer gas into the room or house. The connection between the inlet leg of the trap and the sink, basin or like fixture is usually made by flaring out the inlet leg terminal of the trap in the collar of the fixture.

In order to avoid the expensive and tedious job of wiping the joint at the outlet of the trap and the soil pipe, the following arrangement is made: Each of the traps shown in Figs. 1 to 6, inclusive, has its inlet leg A connected with the sink, basin or like fixture B in the usual manner, and the inlet leg A terminates in the double bend or trap proper A', which leads to the outlet leg $A^2$ having at its end position a permanent ferrule $A^3$ of cast iron or other metal harder than lead, the said ferrule being attached to the outlet leg by spinning the lead of the outlet leg over the wall of the ferrule $A^3$, preferably at the inside thereof, the lead being also spun or drawn over the flanged mouth of the ferrule, as plainly shown in Fig. 7.

The diameter of the ferrule $A^3$ is in excess of the diameter of the lead pipe of which the trap is formed, and when the lead of the end portion of the outlet leg $A^2$ is spun against the inside of the wall of the ferrule $A^3$, then the diameter of the end portion of the outlet leg is increased and at the same time a continuous lead surface is maintained throughout. By providing the outlet leg $A^2$ of the trap with the ferrule $A^3$, as described, the outlet leg is reinforced, and when the trap is placed in position its outlet leg can be thoroughly calked in the receiving hub of the soil or waste pipe C, thus insuring the formation of a gas-tight joint at the junction of the trap with the soil or waste pipe C.

By the arrangement described the manufacturer can furnish to the plumber a complete trap having a reinforced outlet leg, thus enabling the plumber to properly connect the soil or waste pipe with the sink, basin or the like in an inexpensive manner, and within a comparatively short time.

It is expressly understood that the traps are manufactured in the various shapes and sizes well known in the trade, and each trap is provided with the reinforcing ferrule as set forth and shown, to permit the plumber to make a calked joint connection with the waste or soil pipe instead of the expensive wiped joint, as heretofore practiced.

The traps are provided at the bottoms of the bends with the usual screw plugs D for cleaning out purposes and the traps may also be provided with vents E, as indicated in Figs. 3, 5 and 6.

Having thus described my invention, I claim as new and desire to secure by Letters Patent:

In a fitting for traps and the like, a piece of lead pipe, and a ferrule of a metal harder than lead and having a flanged outer end, the ferrule fitting upon the lead pipe and having the lead of said pipe spun upon its inner surface and over the flanged end to its termination, the lead spun over the flanged
5 end terminating near said end, having its outer surface gradually approaching and merging into the outer surface of the ferrule.

In testimony whereof I have signed my name to this specification in the presence of two subscribing witnesses.

PAUL AYRES.

Witnesses:
  THEO. G. HORSTE,
  EVERARD B. MARSHALL.